United States Patent
Aimoto

(10) Patent No.: US 8,730,962 B2
(45) Date of Patent: May 20, 2014

(54) PACKET SWITCH AND SWITCHING METHOD FOR SWITCHING VARIABLE LENGTH PACKETS

(75) Inventor: Takeshi Aimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 332 days.

(21) Appl. No.: 12/550,508

(22) Filed: Aug. 31, 2009

(65) Prior Publication Data

US 2009/0323707 A1   Dec. 31, 2009

Related U.S. Application Data

(60) Continuation of application No. 10/197,464, filed on Jul. 18, 2002, now Pat. No. 7,602,289, which is a division of application No. 09/280,980, filed on Mar. 30, 1999, now Pat. No. 6,570,876.

(30) Foreign Application Priority Data

Apr. 1, 1998   (JP) ..................................... 10-088330

(51) Int. Cl.
    *H04L 12/28*   (2006.01)
(52) U.S. Cl.
    USPC ............................ 370/392; 370/412; 370/468
(58) Field of Classification Search
    USPC ....................... 370/401, 395.3, 412, 419, 429
    See application file for complete search history.

(56) References Cited

U.S. PATENT DOCUMENTS

| | | | |
|---|---|---|---|
| 5,231,633 A | 7/1993 | Hluchyj et al. | 370/429 |
| 5,268,900 A | 12/1993 | Hluchyj et al. | 370/94.1 |
| 5,440,547 A | 8/1995 | Easki et al. | 370/395.3 |
| 5,546,391 A | 8/1996 | Hochschild et al. | 370/413 |
| 5,592,476 A | 1/1997 | Calamvokis et al. | 370/390 |
| 5,675,573 A | 10/1997 | Karol et al. | 370/230 |
| 5,726,987 A | 3/1998 | Uriu et al. | 370/395.72 |
| 5,748,629 A | 5/1998 | Caldara et al. | 370/389 |
| 5,920,568 A * | 7/1999 | Kurita et al. | 370/412 |
| 5,995,491 A * | 11/1999 | Richter et al. | 370/263 |
| 5,996,019 A | 11/1999 | Hauser et al. | 370/429 |

(Continued)

FOREIGN PATENT DOCUMENTS

| | | |
|---|---|---|
| JP | 7135512 | 5/1995 |
| JP | 983547 | 3/1997 |

(Continued)

OTHER PUBLICATIONS

Notification of Reasons for Refusal dated Sep. 7, 2010, issued in corresponding Japanese Patent Application No. 2008-241051 along with English language translation.

*Primary Examiner* — Brian O'Connor

(74) *Attorney, Agent, or Firm* — Brundidge & Stanger, P.C.

(57) ABSTRACT

A packet switch for switching variable length packets. Each output port interface of the packet switch includes a buffer memory, a transmission priority controller, and a packet readout controller. The buffer memory stores transmission packets. The transmission priority controller classifies, based on a predetermined algorithm, transmission packets passed from a packet switching unit into a plurality of queue groups to which individual bandwidths are assigned respectively, and queues the transmission packets in the buffer memory so as to form a plurality of queues according to transmission priority in each of the queue groups. The packet readout controller reads the transmission packets from each of the queue groups in the buffer memory according to the order of transmission priority of the packets while guaranteeing the bandwidth assigned to the queue group.

18 Claims, 7 Drawing Sheets

| 42 PROTOCOL\PRIORITY | A | B | C | ---------------- | ETC. |
|---|---|---|---|---|---|
| 0 (MIN) | 4 | 0 | 4 | | 0 |
| 1 | 4 | 1 | 4 | | 1 |
| 2 | 4 | 2 | 4 | | 2 |
| 3 | 4 | 3 | 4 | | 3 |
| 4 | 4 | 3 | 4 | | 4 |
| 5 | 4 | 3 | 5 | | 5 |
| 6 | 4 | 3 | 6 | | 6 |
| 7 (MAX) | 4 | 3 | 7 | | 7 |

(56) References Cited

U.S. PATENT DOCUMENTS

| | | | |
|---|---|---|---|
| 6,067,301 A | 5/2000 | Aatresh | 370/418 |
| 6,078,953 A * | 6/2000 | Vaid et al. | 709/223 |
| 6,091,708 A | 7/2000 | Matsunuma | |
| 6,101,193 A * | 8/2000 | Ohba | 370/429 |
| 6,104,700 A * | 8/2000 | Haddock et al. | 370/235 |
| 6,304,578 B1 * | 10/2001 | Fluss | 370/413 |
| 6,473,432 B1 * | 10/2002 | Nishimura et al. | 370/412 |
| 6,584,509 B2 * | 6/2003 | Putzolu | 709/240 |
| 6,791,947 B2 | 9/2004 | Oskouy et al. | 370/238 |
| 7,136,356 B2 * | 11/2006 | Suzuki et al. | 370/235 |
| 7,420,969 B2 | 9/2008 | Siu et al. | 370/388 |
| 7,466,703 B1 | 12/2008 | Arunachalam et al. | 370/392 |
| 7,475,156 B2 * | 1/2009 | Kerr et al. | 709/238 |
| 7,710,871 B2 * | 5/2010 | Lavian et al. | 370/230 |

FOREIGN PATENT DOCUMENTS

| | | |
|---|---|---|
| JP | 9331359 | 12/1997 |
| JP | 10023012 | 1/1998 |
| WO | 9742788 | 11/1997 |

* cited by examiner

PS : PACKET SWITCH
PT : PACKET TERMINAL

FIG. 4

| PROTOCOL / PRIORITY | A | B | C | ---------------- | ETC. |
|---|---|---|---|---|---|
| 0 (MIN) | 4 | 0 | 4 | | 0 |
| 1 | 4 | 1 | 4 | | 1 |
| 2 | 4 | 2 | 4 | | 2 |
| 3 | 4 | 3 | 4 | | 3 |
| 4 | 4 | 3 | 4 | | 4 |
| 5 | 4 | 3 | 5 | | 5 |
| 6 | 4 | 3 | 6 | | 6 |
| 7 (MAX) | 4 | 3 | 7 | | 7 |

FIG. 5

| SOURCE / DESTINATION | An | Bn | Cn | ---------------- | ETC. |
|---|---|---|---|---|---|
| Am | 1 (BW1) | — | — | | — |
| Bm | — | 2 (BW2) | — | | — |
| Cm | — | — | 3 (BW3) | | — |
| Dm | — | — | — | 4 (BW4) | — |
| Em | — | — | — | | — |
|  | — | — | — | | — |
|  | — | — | — | | — |
| ETC. | — | — | — | | j (BWj) |

— : PACKET DISCARD j (BWj) : RESIDUAL BANDWIDTH

PACKET SWITCH AND SWITCHING METHOD FOR SWITCHING VARIABLE LENGTH PACKETS

The present application is a continuation application of Ser. No. 10/197,464, filed Jul. 18, 2002, now U.S. Pat. No. 7,602,289; which is a divisional application of Ser. No. 09/280,980, filed Mar. 30, 1999, now U.S. Pat. No. 6,570,876, which claims priority from Japanese Patent Application No. 10-088330, filed Apr. 1, 1998, the contents of which are incorporated herein by reference.

BACKGROUND OF THE INVENTION (1) Field of the Invention

The present invention relates to a packet switch and a switching method, more particularly to a packet switch and a switching method for switching variable length packets by controlling transmission of packets according to the priority of respective packets. More concretely, the present invention relates to a packet switch and a switching method suitable for switching variable length packets in the Internet, as well as intranets, and capable for transmitting the variable length packets by controlling a bandwidth thereof.

(2) Description of the Related Art

The packet communication is a communication method for transmitting and receiving data in a form of a packet comprising a predetermined format of header and a data block obtained by dividing transmission data into blocks each having a proper length, for example, 48 byte to 1.5 Kbytes in length. A packet switch adopts a so-called stored and forward switching method, in which switching of communication data is carried out after the communication data as stored temporarily in the switch, so that it is able to apply a variety of control to the packets passing through the switch.

In the case of the Internet coming into wide use rapidly in recent years, data is communicated as variable length packets with an IP (Internet Protocol) header respectively. Therefore, a packet switching technique is essential to each node for connecting a network to another. An inter-networks connecting apparatus (node apparatus) such as a router is also provided with the packet switching function even if it is not called a "packet switch" actually. Consequently, in the present invention, every network apparatus provided with the packet switching function, including the node apparatus having such a specific name as router, will be referred to as a packet switch.

As a prior art related to such the packet switching, a router is disclosed in Japanese unexamined Patent Publication No. 7-135512. The prior art intends to provide a router with a function for controlling the transfer of received packets according to the priority thereof and a function for controlling the discard of packets performed when a buffer congestion occurs. According to the prior art, packets received by a packet receiving unit are queued in a buffer memory by a priority control unit according to the transmission priority and the discard priority of each packet, then they are transmitted to a packet transmission unit according to the order of the transmission priority. The priority control unit refers to a mapping table based on the transmission priority information and the protocol information included in the header of each received packet to obtain the processing priority and the discard priority corresponding to the received packet, and stores the packet in one of queues prepared corresponding to the discard priority for each processing priority. Stored packets are output sequentially according to the order of descending processing priority. When the free area capacity of the buffer memory goes under a predetermined threshold value, discard control of the stored packets is carried out to avoid congestion. In this discard control, packets with higher discard priority are discarded from queues according to the order of ascending processing priority until the free area capacity of the buffer memory reaches a target threshold value.

In the case of the above related art, only one type of the mapping table is referred for queuing packets. The transmission priority and the discard priority of each packet are defined in the mapping table corresponding to the priority information and the protocol information included in the header of each of received packets. Consequently, in the case of the related art, it is difficult to control a bandwidth for each packet flow and to provide peculiar packet switching services depending on, for example, the source or destination network of those packets in a node apparatus connecting a plurality of networks such as the Internet.

SUMMARY OF THE INVENTION

It is an object of the present invention to provide a packet switch and a packet switching method that can control a bandwidth of each of variable length packet flows.

It is another object of the present invention to provide a packet switch and a packet' switching method that can guarantee the bandwidth previously reserved for each of variable length packet flows by a communication service contract.

It is still another object of the present invention to provide a packet switch and a packet switching method that can perform both bandwidth control and priority control for each variable length packet flow.

It is further another object of the present invention to provide a packet switch and a packet switching method that can perform both bandwidth control and priority control according to the communication protocol of variable length packets.

In order to achieve the above objects, the packet switch of the present invention comprises a plurality of input port interfaces, a plurality of output port interfaces, and a packet switching unit for switching each of variable length packets received from the input port interfaces to one of the output port interfaces corresponding to the destination address of the packet, wherein each of the output port interfaces comprises a buffer memory for storing transmission packets, a transmission priority controller configured so as to classify the transmission packets received from the packet switching unit based on a predetermined algorithm and queue each of those transmission packets according to transmission priority thereof into one of a plurality of queue groups, each of which is assigned an individual bandwidth, a transmission packet read-out controller for accessing the queue groups of the buffer memory cyclically to read out transmission packets from each of those queue groups according to the order of descending transmission priority while guaranteeing the bandwidth assigned to each queue group, and a packet transmission circuit for transmitting the transmission packets read out by the transmission packet read-out controller to an output port associated with the output port interface.

According to an embodiment of the present invention, the transmission priority controller is, for example, provided with means for identifying communication service contract and transmission priority related to each of transmission packets according to the header information of the transmission packet received from the packet switching unit, thereby to queue the transmission packet in a queue corresponding to the identified transmission priority in a queue group corresponding to the identified communication service contract.

More concretely, the transmission priority controller includes, for example, a first management table for defining the identifier of the queue group corresponding to the combination of a source network address and a destination network address and a second management table for defining a transmission priority corresponding to the combination of a communication protocol and a packet priority, thereby to identify a queue group corresponding to each of the transmission packets by referring to the first management table based on the source network address and the destination network address included in the header of the transmission packet, and to identify the transmission priority of the transmission packet by referring to the second management table based on the communication protocol information and the packet priority information included in the header of the transmission packet.

According to another embodiment of the present invention, the transmission priority controller identifies a queue group corresponding to each of the transmission packets based on the protocol information included in the header of the transmission packet, then queues the transmission packet in one of the queues in the identified queue group. In this case, for example, the object of switching is an IP packet which is identified by the protocol of the network layer of the OSI (Open Systems interconnection) reference model, and transmission packets are classified into a plurality of queue groups according to the protocol type of the transport layer of the OSI reference model, for example, TCP (Transmission Control Protocol), UDP (User Datagram Protocol), ICMP (Internet Control Message Protocol), or IGMP (Internet Group Management Protocol).

In order to guarantee the bandwidth of each queue group, the transmission packet read-out controller of the present invention specifies, for example, a queue group among the queue groups cyclically to read out transmission packets, assigns a packet read duration to the specified queue group depending on the bandwidth thereof, and reads out transmission packets according to the order of descending transmission priority.

Furthermore, according to an embodiment of the present invention, the transmission packet read-out controller includes a management table for defining a threshold value in proportion to the bandwidth corresponding to each of the queue groups and a control means for accessing the plurality of queue groups cyclically to read out transmission packets continuously from each of the queue groups, until the total length of the read out packets exceeds the threshold value defined in the management table and for storing the surplus length of the read out packet exceeding the threshold value as an initial value for use in the counting of the total packet length in the next read cycle.

The controlling means, for example, checks the initial value for counting the total packet length associated with one of the queue groups before reading out transmission packets from the queue group. If the initial value exceeds its threshold value, the controlling means subtracts the threshold value from the initial value and switches the object of packet read out to a next queue group without reading out any packets from the current queue group. Consequently, variable length packets are readout to an output port, while the bandwidth is controlled properly in a long-ranged view.

The algorithm provided for the transmission priority controller to classify transmission packets, as well as the bandwidth control function provided for the transmission packet read-out controller can be modified suitably, for example, in response to a control command issued from an external network management terminal.

Another feature of the packet switch of the present invention resides in that each of the input port interfaces comprises a receiving buffer memory for storing received packets temporarily, a relaying priority controller configured so as to filter the packets received from input ports based on the destination address of the received packets, classify the filtered received packets according to their priority based on a predetermined algorithm, and queue those classified packets in the receiving buffer memory according to the priority, and a received packet read-out circuit for reading out the received packets from the receiving buffer memory according to the order of priority to supply those packets to the packet switching unit. By transferring the packets according to the order of priority in both of the input port interfaces and the output port interfaces, it is possible to reduce the delay time of high priority packets within the packet switch more significantly. The switching method of the present invention for switching variable length packets comprises the steps of: (a) filtering received packets received from an input port based on the destination address of each of those packets; (b) transferring the filtered packets to one of the output ports interfaces as transmission packets according to the destination address included in the header of each of those packets; (c) classifying the transmission packets based on a predetermined algorithm and queuing the classified packets according to transmission priority into one of the a plurality of queue groups assigned with a individual bandwidth respectively; (d) accessing the plural queue groups cyclically to read out transmission packets from each of those queues according to the order of transmission priority while guaranteeing the bandwidth assigned to each of the queue groups; and (e) transmitting the read out transmission packets to an output port.

More specifically, the step (b) of transferring received packets preferably includes a step (b1) of queuing received packets according to priority in the receiving buffer and a step (b2) of reading out the received packets stored in the receiving buffer according to the order of priority and transferring those packets as transmission packets to one of the output interfaces.

In the step (c) for queuing transmission packets, for example, transmission packets are classified by communication service contract related to each of those transmission packets and queued in a queue group corresponding to the communication service contract by transmission priority. Instead of this, transmission packets may be classified by communication protocol related to each of those transmission packets, so that those transmission packets are queued according to transmission priority in a queue group corresponding to the protocol thereof in the step (c).

BRIEF DESCRIPTION OF THE DRAWINGS

FIG. 4 is an example of a mapping table 40 for defining a transmission priority corresponding to both protocol and priority of each packet.

FIG. 5 is an example of a mapping table 50 for defining a bandwidth according to both source and destination addresses of each packet.

DESCRIPTION OF THE PREFERRED EMBODIMENTS

Figure 1:
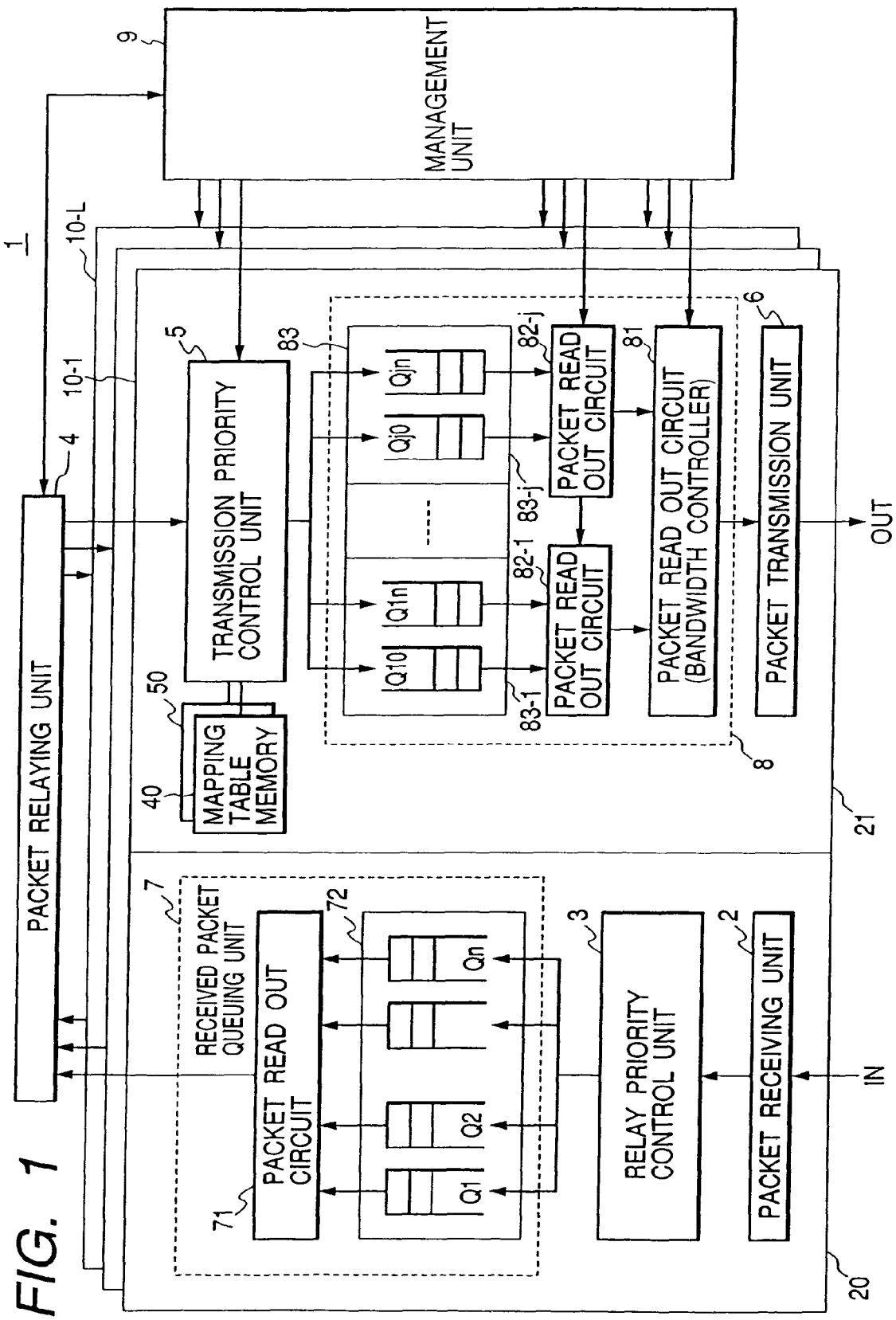
FIG. 1 is a block diagram indicating an embodiment of the packet switch of the present invention.

At first, the configuration and operation of the packet switch of the present invention will be described briefly with reference to FIG. 1.

The packet switch 1 comprises a plurality of control boards (10-1 to 10-L) prepared for each of input/output ports, a packet relaying unit (packet switching unit) for relaying packets between those control boards 10, and a management unit 9 connected to each of the control boards 10. Each of the control boards 10 comprises an input port interface 20 and an output port interface 21.

The input port interface 20 includes a packet receiving unit 2 for receiving packets flowing on a network from an input port IN, a relaying priority control unit 3 for storing the packets received from the packet receiving unit in a receiving buffer memory 72 according to the priority, and a received packet queuing unit 7 for transferring the packets stored in the receiving buffer memory 72 to the packet relaying unit 4 according to the priority.

The output port interface 21 includes a transmission priority control unit 5 for storing the packets received from the relaying unit 4 selectively in one of a plurality of queue groups formed in a transmission buffer 83 (83-1 to 83-j), a transmission packet queuing unit 8 for reading out the packets stored in the transmission buffer 83 according to the transmission priority while guaranteeing the bandwidth assigned to each queue group, and a packet transmission unit 6 for transmitting the transmission packets read out by the transmission packet queuing unit 8 to an output port OUT connected to a network.

The relaying priority control unit 3 is provided with a filtering function of referencing to a routing table based on the destination address included in the header of each received packet to determine whether the transmission packet should be relayed to another network or not. If it is determined that the transmission packet should be relayed to another network, the packet is given an output port identifier, then queued in the receiving buffer memory 72 according to the priority. More concretely, the relaying priority control unit 3 determines a relaying priority based on the management information (packet priority information, protocol information, network address, etc., which will be described later in detail with reference to FIG. 3) and stores the received packet in a queue Qi corresponding to the determined relaying priority. The queue Qi is one of a plurality of packet queues Q1 to Qn formed by relaying priority in the receiving buffer memory 72.

In the received packet queuing unit 7, packets are read out by the packet read-out circuit 71 sequentially from the queues formed in the receiving buffer memory 72 according to the order of descending priority, then output to the packet relaying unit 4. The relaying unit 4 comprises, for example, a bus or crossbar switch for switching the packets received from the receiving packet queuing unit 7 provided in each control board 10 to one of the other control boards identified by the output port identifier added to the packet.

The transmission priority control unit 5 stores packets received from the relaying unit 4 in a transmission buffer memory 83 (83-1 to 83-j) as transmission packets.

A feature of the present invention resides in that the transmission priority control unit 5 forms a multi-dimensional queue structure in the transmission buffer 83 by classifying transmission packets into a plurality of groups base on the header information of each of those packets and queuing those transmission packets according to the transmission priority for each group.

In the illustrated embodiment, the transmission buffer 83 is divided into a plurality of buffer areas, each of which includes a plurality of queues (Q10 to Q1n) . . . (Qj0 to Qjn), so that a total of j queue groups 83-1 to 83-j are formed. The transmission priority control unit 5, as will be described later, refers to the mapping tables 40 and 50, which will be described later with reference to FIGS. 4 and 5, based on the control information (e.g., packet priority information, protocol information, network address, etc. as will be described later in detail with reference to FIG. 3) included in the header of each packet, thereby determining the transmission priority and the queue group of the transmission packet. Each of the queue groups, as will be described later, is assigned with an individual bandwidth, and each of transmission packets is stored in the queue Qik in one of those queue groups corresponding to the transmission priority.

The transmission packet queuing unit 8 includes first stage read-out circuits 82 (82-1 to 82-j) for reading out packets according to the transmission priority from each queue group (buffer area 83-i) and a next stage read-out circuit 81 for outputting the packets read out by those first-stage read-out circuits to the transmission unit 6 according to the bandwidth assigned to each queue group.

The packet transmission unit 6 transmits packets received from the read-out circuit 81 to an output port OUT. The output port identifier added by the relaying priority control unit 3 to each received packet is removed by the transmission priority control unit 5 or the packet transmission unit 6. Grouping of transmission packets performed by the transmission priority control unit 5 is made, to put in the concrete, for each communication service contract between a line provider and a network user or customer user group. The read-out circuit 81 reads out transmission packets sequentially from each of the queue groups so as to adapt to the communication service level promised by each contract.

A communication service contract mentioned here means a bandwidth guarantee contract exchanged between a network user and a network line provider (or an Internet communication provider). More concretely, it means a contract between a business company or a public agency and a line provider. According to such a contract, a communication service level including such items as communication quality (e.g., packet delay time, delay variability, packet discard rate, etc.), an assigned bandwidth, etc., is guaranteed for each user. Each of those network line providers is thus responsible for the contracted communication service level with respect to each packet flow on the subject network.

Figure 2:
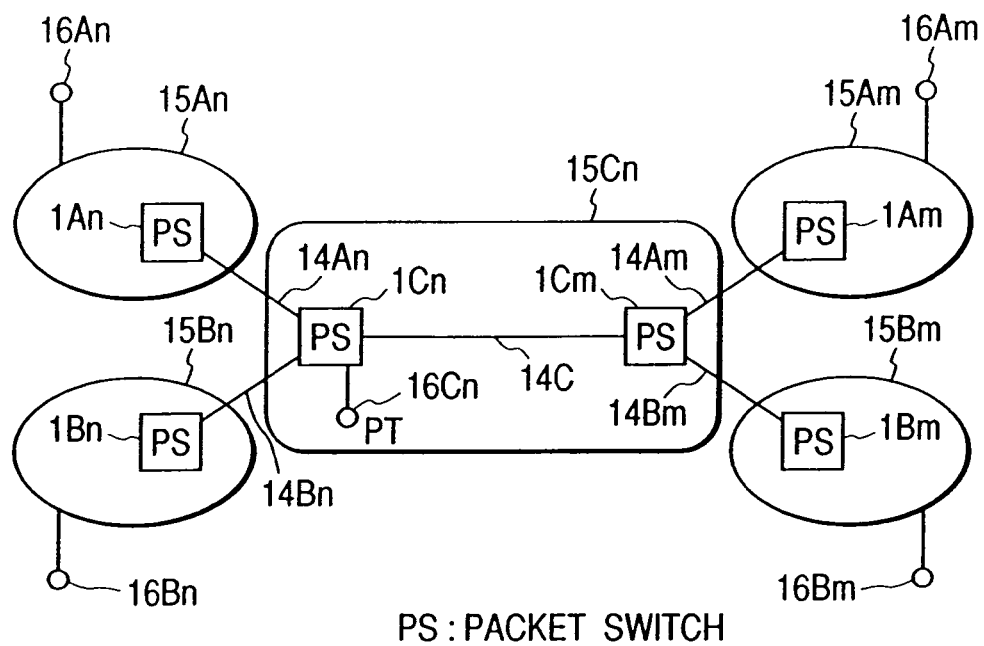
FIG. 2 is a configuration of a network to which the packet switch of the present invention applies.

A network manager can change the packet queuing algorithm in the transmission priority control unit 5 and the read-out algorithm in the read-out circuits 81 and 82 via the management unit 9 by issuing a command, for example, from the management
terminal PT shown with a reference numeral I6Cn in FIG. 2.

The packet queuing algorithm used by the transmission priority control unit 5 can be changed by updating the contents in the mapping tables 40 and 50 and the packet read-out algorithm used by the read-out circuit 81 can be changed by updating the contents in the management table 60 as will be described later.

Next, a configuration of the packet switch of the present invention, as well as how to use the packet switch will be described with reference to FIG. 2.

The network shown in FIG. 2 comprises sub-networks 15An, 15Bn, 15Am, and 15Bm, and a backbone network 15Cn for connecting those sub-networks to each other. Each of the sub-networks 15An to 15Bm is connected to packet communication terminals 16An, 16Bn, 16Am, and 16Bm respectively.

Each of the sub-networks 15An to 15Bm is provided with packet switches 1An, 1Bn, 1Am, and 1Bm. The packet switches 1An and 1Bn are connected to a packet switches 1Cn in the network 15Cn through the lines 14An and 14Bn respectively. The packet switches 1Am and 1Bm are connected to a packet switch 1Cm in the network 15Cn through the lines 14Am and 14Bm respectively. In the backbone network 15Cn are connected the packet switches 1Cm and 1Cm to each other through a line 14C.

The packet switches 1 of the present invention shown in FIG. 1 are used as packet switches 1Cn and 1Cm of the backbone network. 16Cn indicates a management terminal operated by the manager of the network 15Cn. According to the commands issued from this management terminal 16Cn, the control information held in the packet switches 1Cn and 1Cm, that is, the contents in the tables 40, 50, and 60 can be updated.

Generally, a packet communication can perform a multiplex communication, wherein a bandwidth indicating a communication capability of a line per unit time is divided to assign the bandwidth to a plurality of users.

In the case of the network shown in FIG. 2, the communication 10 line 14C of the backbone network is shared by the communication between the sub-networks 15Bn and 15Bm and the communication between the sub-networks 15Bn and 15Bm. Packet communication allows each line to be used effectively through the statistical multiplexing effect by sharing a line among a plurality of communications such way and by assigning a bandwidth to each of those communications only when it is needed actually.

In this case, it is assumed that the communication between the sub-networks 15An and 15Am is executed under the contract A and the communication between the sub-networks 15An and 15Am is executed under the contract B, and the network provider who owns the backbone network 15C provides packet flows on the line 14C with packet switching services according to the service levels guaranteed by the contracts A and B. This example is equivalent to a case in which the sub-networks 15An and 15Am are, for example, of the head office and a branch office of a company A and the sub-network 15Bn and 15Bm are of the head office and a branch office of a company B, and each of those companies A and B perform their intranet communications according to the contracts with the Internet communication provider C.

The packet switch of the present invention provides the following two forms of usage for a plurality of contract parties who share the line 14C.

The first form of usage distributes the bandwidth of the line 14C to both contracts A and B equally or with a weight according to the contract contents respectively, through the rate based scheduling. If there are a plurality of packet flows for the same contract, packet switching is carried out equally for each of those packet flows or according to the protocol and the packet priority of each packet flow.

The second form of usage allows only one contract, for example, the packet flow of the contract A to use the full bandwidth of the line 14C through the head-of-line scheduling. In this case, the guaranteed bandwidth is set as 0 for all the packet flows of other contracts except for the contract A, and packet switching for these contracts are carried out using the residual bandwidth of the contract A. According to this second form of usage, the user of a contract B can make a communication with a less cost by using the residual bandwidth of the contract A, although the communication quality is not guaranteed for the contract B. If there are a plurality of packet flows for the same contract, packet switching is carried out equally to each of the packet flows or according to the protocol and the priority of each packet flow just like in the first form of usage.

None of the conventional packet switches is provided with such the function for guaranteeing communication services for respective contracts stated, above and the function for controlling transmission of a plurality of packet flows under the same contract according to the priority with respect to such variable length packets as IP packets.

Figure 3:
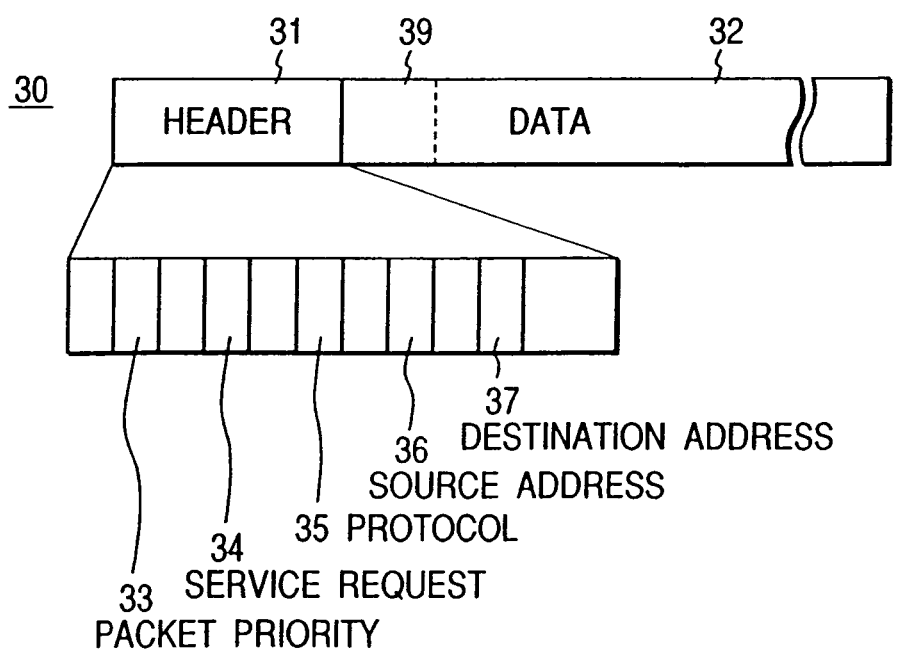
FIG. 3 is a format of packets to be processed by the packet switch of the present invention.

FIG. 3 shows a format of the packets handled by the packet switch of the present invention.

A packet 30 comprises a header portion 31 and a data portion 32. The header portion 31 includes packet priority information 33, a service request 34, protocol information 35, a source address 36, and a destination address 37. The packet priority information 33 indicates the processing priority of the packet. The service request 34 indicates the information of a service requested by the packet, for example, a request for reliability and high speed performance. These items are equivalent to the priority (0 to 2nd bits), the low delay request (3rd bit), the high through-put request (4th bit), and the high reliability information (5th bit) of the TOS (Type Of Service) field defined in the header of each IP packet used for the Internet.

The protocol information 35 indicates the type of the communication protocol used for the packet, that is, the type of the packet. If the packet 30 is an IP packet, the protocol information 35 identifies the type of the transport layer header 39 following the header 31. For the most frequently used protocols, TCP (Transmission Control Protocol), UDP (User Datagram Protocol), ICMP (Internet Control Message Protocol), and IGMP (Internet Group Management Protocol) are well known.

The source address 36 indicates the address of a source device from which the packet is transmitted. The destination address 37 indicates the address of a destination device to which the packet is forwarded. These addresses correspond to the SA (Source IP Address) and the DA (Destination IP Address) in a case of IP address system.

The IP address comprises an IP network address and an IP host address. The IP network address identifies a sub-network connected to a source or destination terminal and the IP host address identifies the source or destination terminal. The communication service contract described above can be identified with the combination of such a source IP network address and a destination IP network address.

Next, description will be made for the mapping tables 40 and 50 referred by the transmission priority control unit 5 to classify transmission packets.

FIG. 4 shows an example of the mapping table 40 referred to determine transmission priorities among a plurality of packet flows transmitted under respective contracts.

The mapping table 40 is a two dimensional matrix arranging, for example, the protocol 35 included in each packet header 31 as column information 41 and the priority information 33 included in the packet header 31 as row information 42, wherein a value is assigned to indicate the transmission priority corresponding to each combination of the priority information 33 and the protocol 35. Each value (0 to 7) of the transmission priority defined in the mapping table 40 also indicates the value of a second index k of the queue Qik formed in the transmission buffer area 83-$i$ shown in FIG. 1.

The type of the protocol 35 may be classified into, for example, TCP and UDP according to the transport layer protocol of the OSI reference model. It may also be classified according to a layer upper than the transport layer, for example, into HTTP (Hyper Text Transfer Protocol), FTP (File Transfer Protocol), TELNET (Terminal Connection), SMTP (Simple Mail Transfer Protocol), and etc. depending on the port number if the protocol type is TCP.

Generally, in the case of an interactive type or connection oriented network protocol such as TCP, the source terminal transmits a next packet after receiving an ACK packet from the destination terminal. On the contrary, in the case of a batch type or connectionless network protocol such as UDP, the source terminal can transmit packets one after another without waiting for an ACK packet from the destination terminal. Consequently, if a higher transmission priority is given to packet flows of the interactive type or connection oriented network protocol and a lower priority is given to packet flows of the batch type or connectionless network protocol in the mapping table 40, it is able to improve the total through-put of the packet switch 1.

FIG. 5 shows a configuration of the mapping table 50 referred by the transmission priority control unit 5 to identify the contract associated with each of the transmission packets and to specify a queue group corresponding to the contract from among the queue groups 83-1 to 83-$j$ shown in FIG. 1.

The mapping table 50 is a two-dimensional matrix arranging the source network address included in the source address 36 of each packet header 31 as column information 51 and the destination network address included in the destination address 37 of the packet header 31 as row information 52, wherein an identification number (contract identifier) of queue group is assigned corresponding to each combination of a source network address and a destination network address.

The reason why transmission packets are buffered in queue groups by contract in the present invention is that reading of packets from the transmission buffer 83 is controlled so as to provide each transmission packet flow with a contracted bandwidth. In the embodiment shown in FIG. 5, a contract is identified by the combination of a source network address and a destination network address, and the identification number of a queue group corresponding to each contract is defined in the mapping table 50. Each contracted bandwidth is shown in parentheses for reference in the mapping table 50.

A queue group identification number as described above is assumed as the value of the first index i of the queue Qik formed in the transmission buffer area 83-$i$. In the illustrated example, the communication between a terminal connected to the sub-network Am and a terminal connected to the sub-network An is carried out under the contract A to which the bandwidth BW1 is assigned. It will thus be understood that packets for this contract A are queued in the queue group 83-1. For each combination of a source network address and a destination network address, which is not included in any specific contract, a null indicated with a symbol "-" is set. Packets having the address information corresponding any of such combinations are discarded by the transmission priority control unit 5. Discarding of such packets that are communicated between non-contracted networks may contribute to improve the security of the packet communication.

The transmission priority control unit 5 refers to the two types of mapping tables 40 and 50 as described above in order to queue transmission packets in the transmission buffer 83. Consequently, a plurality of queue groups 83-1 to 83-$j$ are formed in the transmission buffer 83. Each of those queue groups 83-1 to 83-$j$ has an identification number defined in the mapping table 50 as shown in FIG. 1. And, in each of those queue groups are formed a plurality of queues corresponding to a transmission priority defined in the mapping table 40 respectively as shown in FIG. 6.

Transmission packets stored in the queue groups 83-1 to 83-$j$ are read out by the packet read-out circuits 82-$i$ to 82-$j$ according to the transmission priority for each queue group, then transmitted to the packet transmission unit 6 by the packet read-out circuit 81, while the contracted bandwidth of each queue group is guaranteed.

Hereunder, the operation of the packet read-out circuit 81 will be described with reference to FIGS. 7 and 8.

Figures 6, 7:
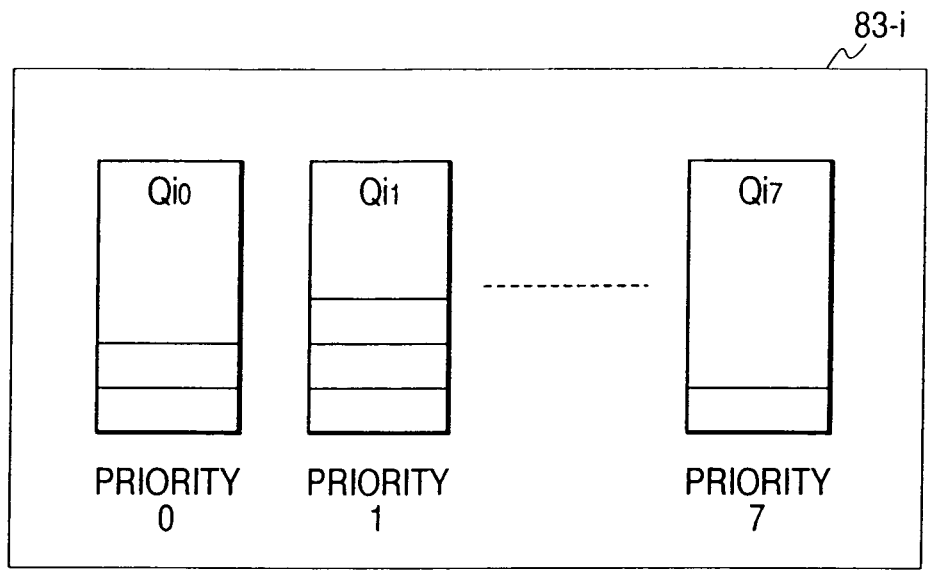
FIG. 6 is a drawing for explaining the layout of queues formed according to transmission priority in a buffer area 83-1 prepared for each bandwidth.
FIG. 7 is an example of a management table provided for a packet read-out circuit 81 shown in FIG. 1.

FIG. 7 shows a configuration of the management table 60 which is referred by the packet read-out circuit 81 to control bandwidths. The management table 60 comprises a plurality of records corresponding to the queue groups 83-1 to 83-$j$. Each of those records comprises a queue group identification number 61, a bandwidth 62 assigned to each queue group, and a counter area 63 for counting the length of transmission data read out from each queue group.

Figure 8:
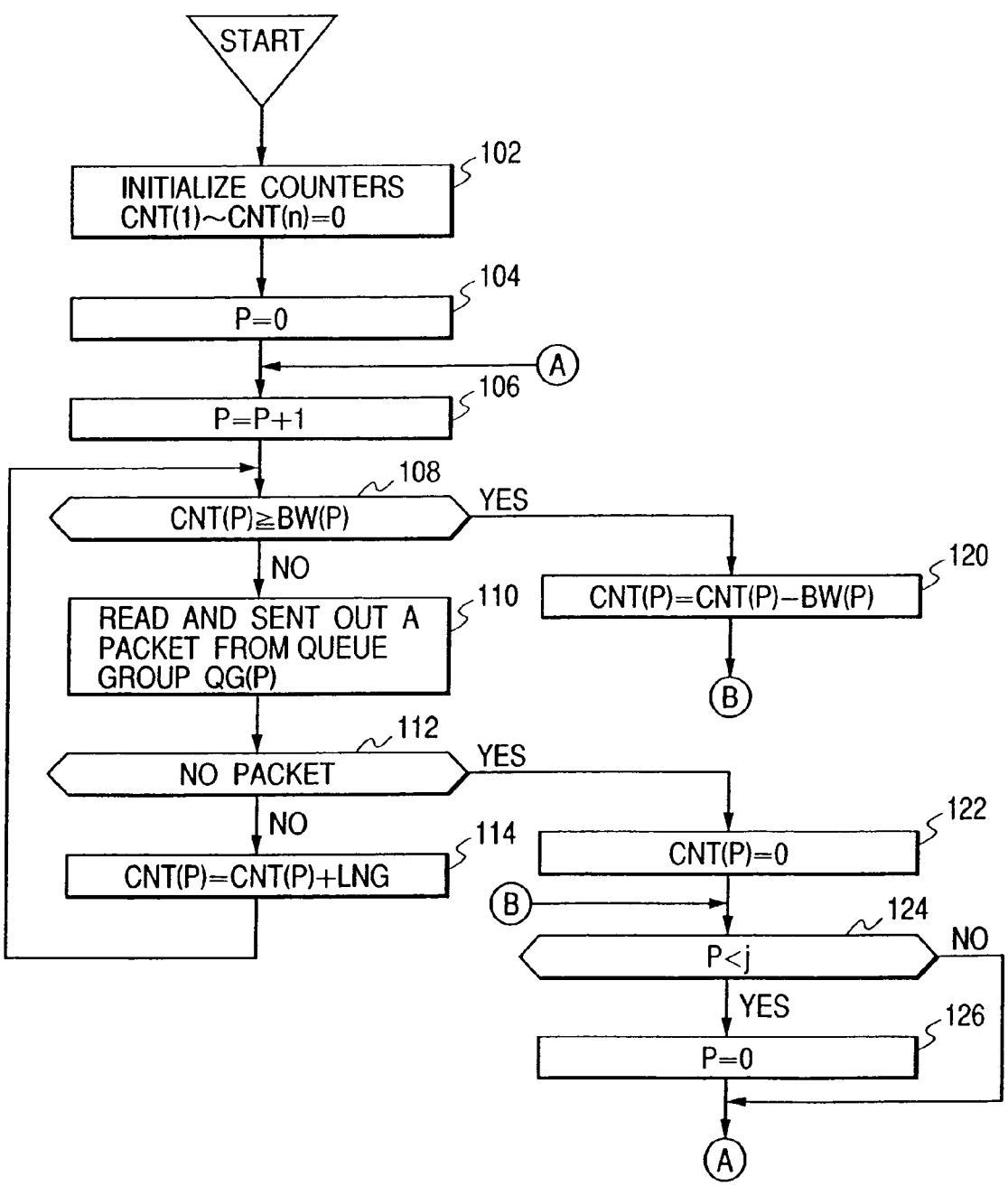
FIG. 8 is a flow chart showing the functions of the packet read-out circuit 81.

FIG. 8 shows a flow chart for a control operation performed by the packet read-out circuit 81.

The packet read-out circuit 81 initializes count values in the counter area 63 of the management table 60 and the value of a parameter p to zero respectively (steps 102 and 104), then increments the value of the parameter p (step 106). After this, the packet read-out circuit 81 compares the value of CNT(p) of the counter 63 with the value of BW(p) of the bandwidth 62 in the p-th record of the management table 60. If the CNT(p) is equal to or more than the BW(p), the packet read-out circuit 81 subtracts the value of BW(p)' from the value of CNT(p) (step 120), then compares the parameter p with the maximum value j (step 124). If the value of the parameter p is less than the maximum value j, the control sequence returns to step 106, otherwise returns to step 106 after clearing the value of parameter p to zero.

If the CNT(p) value is less than the BW(p) value in step 108, the packet read-out circuit 81 reads out a packet from the p-th queue group QG(p) of the output buffer 83 and transmits the packet to the packet transmission unit 6 (step 110). If there is no output packet to be read out in the queue group QG(p) (step 112), the packet read-out circuit 81 clears the counter CNT(p) value to zero (step 122), then performs the processing of step 124. When the packet read-out circuit 81 reads out a packet from the queue group Qt3($p$), the packet read-out circuit 81 adds the packet length to the counter CNT(p) (step 114), then returns to step 108.

Figure 9:
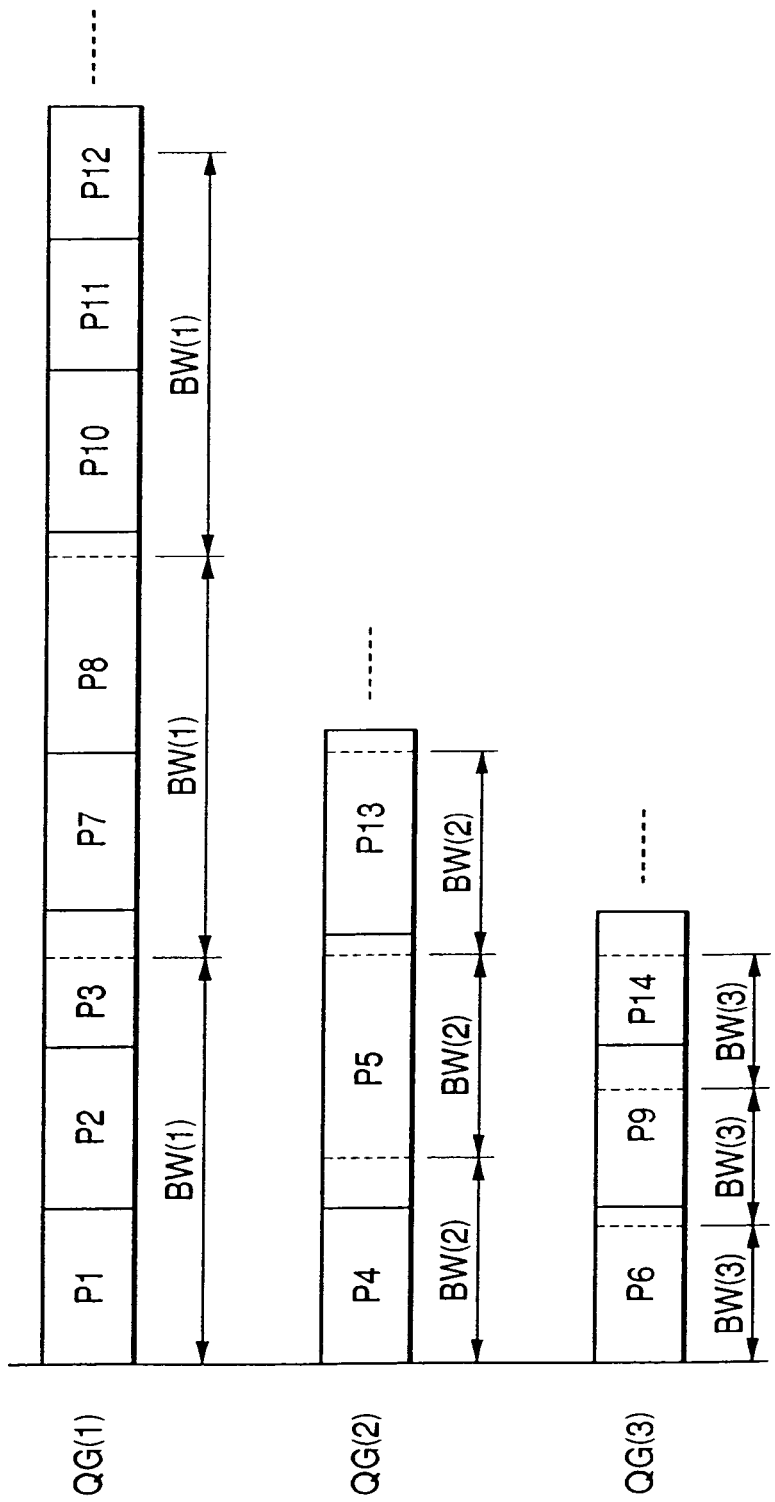
FIG. 9 is a drawing for explaining the order of packets read out by the packet read-out circuit 81.

FIG. 9 shows an explanatory view of a sequence of packets read out through the read control operation described above. It is assumed here that packets are read out from three queue groups QG(1), QG(2), and QG(3) to which bandwidths BW(i), BW(2), and BW(3) are assigned, respectively, for simplifying the description. The rate of the above bandwidths is assumed to be BW(1):BW(2):BW(3)=3:2:1.

According to the control flow chart shown in FIG. 8, the value of parameter p is changed so that each queue group can get a packet read cycle cyclically. Packets are read out from each queue group continuously until the total length of read packets exceeds the value of a contracted bandwidth BW(p)

registered in the management table 60. When the total length of the read packets exceeds the value of the contracted bandwidth BW(p), the packet read-out circuit 81 subtracts the contracted bandwidth BW(p) value from the counter CNT(p) value, then transfers the packet read cycle to next queue group. Consequently, as shown in FIG. 9, when packets P1, P2, and P3 are read out from the first queue group QG(1), the read cycle is transferred to the second queue group QG(2). At this time, the counter CNT(I) value of the queue group QG(I) indicates the length of the residual part of the packet P3 shown with a dotted line.

When packets P4 and P5 are read out from the second queue group QG(2), the read cycle is transferred to the third queue group QG(3). Since the contracted bandwidth of the third queue group QG(3) is small, the read cycle is transferred to the first queue group QG (1) when one packet P6 is read out in this example.

When packets P7 and P8 are read out from the first queue group QG(1), the read cycle is transferred to the second queue group QG(2). In this example, since a long packet PS was read out from the second queue group QG(2) in the previous read cycle, the value of the counter CNT(2) exceeds the value of the contracted bandwidth BW(2). Consequently, in this read cycle, no packet is read out from the second queue group QG(2) and the read cycle is transferred to the third queue group QG(3) after performing subtraction on the value of the counter CNT(2). By repeating the read operations stated above, a series of packets are sent out to the output port OUT sequentially, in the order of P1, P2, . . . , P14. Thus, although the contracted bandwidth is exceeded temporarily, as just like outputting of packets P4 and P5 from the queue group QG(2), the contracted bandwidths of all the queue groups are guaranteed for packet switching in a long-range view.

According to the controlling of packet read-out described above, if it is detected that there is no transmission packet in any one of the queue groups, a chance to read out packets comes round to residual queue groups in a shorter cycle. Consequently, it becomes possible for residual queue groups to effectively use the bandwidth assigned for the empty queue group. In addition, if all the queue groups except one become empty, read cycles are given to the residual queue group almost continuously. As a result, the queue group can use the bandwidth of the output line all to itself, thus receiving a benefit of services over its contracted level.

In FIG. 5, the j-th queue group is used to store such transmission packets that have an extra combination of a source network address and a destination network address other than that correspond to bandwidth guarantee contracts registered in the table 50. For the j-th queue group, assigned is a residual bandwidth BWj which is a residual bandwidth of the output line left by the other contractors. The user of the residual bandwidth BWj shares the residual bandwidth with other non-contract users, so the user can receive a benefit of less-cost communications, although the communication service quality is not so good.

According to the packet read-out control of the present invention, when a bandwidth guaranteed contractor stops communications, the bandwidth for the contractor is released to the users of the residual bandwidth BWj. It is assumed that, as an exaggerated example, a specific user X makes a contract for guaranteeing the exclusive use of the full bandwidth of the output line 14C and the residual bandwidth of the user X is assigned to the other users. In this case, by modifying the control flow chart shown in FIG. 8, it is also able to realize such a packet read-out control of the head-of-line scheduling that release the full bandwidth of the line 14C to the other users until the next packet flow of the user X arrives whenever the packet flow of the user X stops In the case of such a head-of-the-line scheduling sequence, packets are basically read out repetitively from a queue group of the user X. If there is no packet to be read out in the queue group of the user X, one of the other queue groups is accessed. In this case, packets may be read out one after another by checking whether there is a new packet arrived in the queue group of the user X each time one packet is read out. According to the present invention, therefore, it is possible to realize not only the first usage form, but also the second usage form, thereby providing communication services appropriately to both of the bandwidth contractor and other non-contractors The read-out circuit 82 controls the order of packets to be read out from each queue group, for example, the order of the packets P1, P2, P3, P7, . . . in the first queue group OG(1). In other words, the contracted bandwidth BW(i) assigned to each queue group is further divided by the read-out circuit 82 so as to be assigned to a plurality of queues Qi1 to Qin in the queue group.

In this case, how to assign a bandwidth to each queue is varied widely. In the most basic method, packets are read out from the queues in the order of descending priority and subsequent priority queue is accessed to read out packets when the higher priority queue becomes empty. Instead of this method, it is also possible to assign a bandwidth to each queue according to the order of priority beforehand, then give a different readout time to each queue just like the method used by the read-out circuit 81. In this case, the controlling procedure is modified so that the queue group QG(p) is replaced with the queue Q(p) in the flow chart shown in FIG. 8.

In order to simplify controlling of packet reading more, it is also possible to assign the number of packets readable continuously for each queue beforehand regardless of the packet length so that packets are read out from the next queue when the assigned number of packets are readout from one queue according to the order of descending priority. It is also possible to read out packets one by one from each queue simply according to the order of descending priority, if necessary.

According to the flaw of output packets from the output buffer 83 to the output port OUT, the read-out circuit 82 is located in front of the read-out circuit 81. However, in a viewpoint of the read-out control procedure, a queue group is determined first by the read-out circuit 81, then the read 20 out circuit 82 corresponding to the determined queue group reads out packets from one of the queues in the group as shown in the flow chart in FIG. 8.

In the packet switch shown in FIG. 1, a read-out circuit 82 is disposed for each queue group in order to make it easier to understand the present invention. In this case, while packets are read out from one queue group and passed to the next stage read-out circuit 81, none of the read-out circuits 82 in other queue groups transmits packets. Consequently, all the packets stored in the output buffer 83 may be read out by one read-out circuit 82 by switching over the queue groups in turn, in an actual application.

In addition, if an address table for indicating the addresses of the first packets of the respective queues is prepared for each queue group and if the address table is referred in accordance with the queue group QG(p) specified in step 110 in FIG. 8 to read out packets from a queue identified by the priority, the functions of both read-out circuits 81 and 82 can be realized by a processor or a dedicated hardware circuit.

Figure 10:
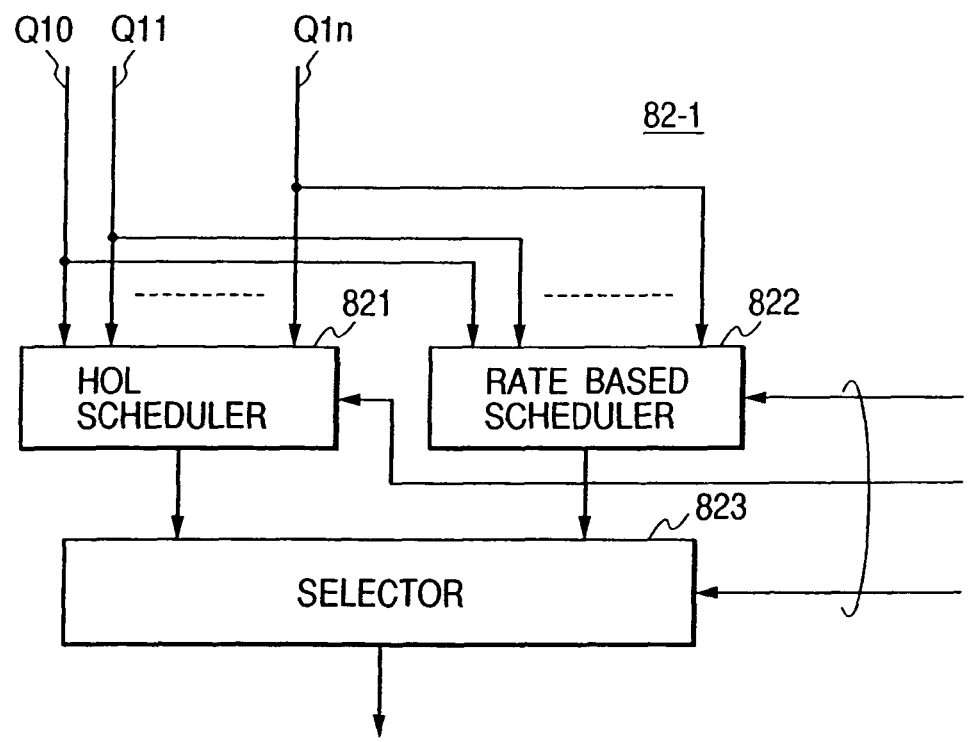
FIG. 10 is a block diagram' showing another embodiment of the packet read-out circuit 82-1 shown in FIG. 1.

FIG. 10 indicates the packet read-out circuit 82 in another embodiment.

This packet read-out circuit 82 comprises a complete priority type controlling circuit 821 for controlling the read out of packets so that all the packets are read out from the first priority queue, then from the next and subsequent priority queues sequentially, a rate based scheduler type of controlling circuit 822 for controlling the reading out of packets so that packets are read out from a plurality of queues in a queue group according to each assigned bandwidth, and a selector circuit 823 for selecting any one of the two controlling circuits according to a control signal from the management unit 9. One of the controlling circuits 821 and 822 is activated according to the control signal from the management unit 9. According to this embodiment, the read-out mode of the transmission packet in the packet switch 1 can be switched over in a moment by a command supplied from a management terminal operated by the network manager.

In the above embodiment, description has been made for packet switching in the network layer of the OSI reference model represented by IP packets, but the technical concept of the present invention may also apply to the data link layer of the OSI reference model, thereby controlling the bandwidth for each of the queue groups described above, for example, in an ETHERNET LAN switch.

In the embodiment described with reference to FIG. 5, the bandwidth of each queue group is controlled under each contract identified from both source and destination network addresses. The present invention may also apply to another embodiment in which the transmission priority control unit 5 classifies transmission packets by protocol, for example, TCP and other protocols into two groups, and transmission packets are queued into a plurality of queues for each queue group according to the packet priority included in the header information of each packet. In this case, bandwidths may be assigned to queue groups in such a manner that the whole bandwidth of an output line is assigned only to TCP packet flows and the residual bandwidth is assigned to the packet flows of other protocols.

As to be understood from the above description, according to the present invention, it is possible to provide a packet switching in which the packet transmission priority is changed for each network connected to the node apparatus (packet switch) in a communication network such as the Internet in which a plurality of networks are connected through a common line. In addition, according to the present invention, it is also possible to provide a packet switch and a packet switching method that can change the transmission priority even with a communication protocol as needed while the communication bandwidth is guaranteed for each user according to the communication service contract.

What is claimed is:

1. A packet switch for forwarding packets through input ports and output ports, the packet switch comprising:
   a buffer memory;
   a classifier which classifies a packet received through the input ports into one of a plurality of queue groups, in accordance with either at least one of a transport layer protocol and a layer protocol of an Open Systems Interconnection (OSI) reference model higher than the transport layer protocol of the packet, and which classifies the packet into one of a plurality of queues in the queue group;
   a queuing controller which queues the packets into the buffer memory based on a result of classification of the packet by the classifier;
   a packet read-out controller, which reads, from the buffer memory, a packet classified into a specific queue group while guaranteeing a first bandwidth assigned to the specific queue group, and which reads a packet classified into another queue group other than the specific queue group using a bandwidth of the first bandwidth that is unused; and
   a packet sending unit which sends each packet read from the buffer memory to one of the output ports.

2. A packet switch according to claim 1,
   wherein the packet read-out controller for reading the packets from the buffer memory in accordance with a transmission priority corresponding to a queue which a packet classified into while guaranteeing both the first bandwidth assigned to each of the queue groups and a second bandwidth assigned to each queue of the queue groups, based on the packet length of each of the packets to be sent to one of the output ports, which includes a first function of controlling reading of the packets from each of the queue groups and a second function of controlling reading of the packets from each of the queues within the queue groups, and
   wherein the packet sending unit sends each of the packets read from the buffer memory to one of the output ports when each of the packets is determined to be read by both the first function and the second function.

3. The packet switch according to claim 2, wherein the packet read-out controller includes a first counter prepared in association with each of the queue groups and a second counter prepared in association with the queue to which the second bandwidth is assigned in order to sum up the packet length of the packets to be sent for each of the queue groups and the queue, and guarantees the first bandwidth and the second bandwidth by comparing count values of the first and the second counters corresponding to each of the packets with threshold values corresponding to the first bandwidth and the second bandwidth, respectively.

4. The packet switch according to claim 3, wherein the packet read-out controller operates so as to read the packets from the queue having the highest transmission priority within each of the queue groups and read the packets from the next queue in order of transmission priority within the queue group when the highest transmission priority queue has no packet to be read, while guaranteeing the first bandwidth of the queue group.

5. The packet switch according to claim 3, wherein the classifier specifies a communication service contract and the transmission priority of each of packets based on header information of the packet, classifies the packet into the queue group corresponding to the specified communication service contract and queues the packet into the queue corresponding to the specified transmission priority.

6. The packet switch according to claim 3, wherein the classifier has first management information for indicating identifiers of the queue groups in association with different combinations of a source address and a destination address and second management information for indicating the transmission priority in association with different combinations of a communication protocol and packet priority, specifies the queue group corresponding to each of the packets by referring to the first management information based on a source address and a destination address in the header of the packet and specifies the transmission priority corresponding to the packet by referring to the second management information based on protocol information and packet priority information in the header of the packet.

7. The packet switch according to claim 3, further comprising:
   a packet relaying unit and a plurality of control boards each having an input interface for receiving the packets though the input port and an output interface including the buffer memory, the classifier, the packet read-out controller and the packet sending unit, wherein the packet relaying unit forwards the packet received from the input interface of one of the control boards to the output interface of one of the other control boards.

8. The packet switch according to claim 3, wherein the classifier classifies the packets into the queue groups in accordance with an algorithm which is changeable depending on control information supplied from the outside of the packet switch.

9. The packet switch according to claim 1, wherein the classifier specifies the queue group corresponding to each of the packets based on layer protocol information in the header of the packet.

10. A packet switch according to claim 1, wherein the layer protocol higher than the transport layer protocol is at least one of HTTP (Hyper Text Transfer Protocol), FTP (File Transfer Protocol), TELNET (Terminal Connection) and SMTP (Simple Mail Transfer Protocol).

11. A packet forwarding method in a packet switch for forwarding packets through input ports and output ports, the packet switching method comprising the steps of:

classifying each of the packets received through the input ports into one of a plurality of queue groups in accordance either at least one of a transport layer protocol and a layer protocol of an Open Systems Interconnection (OSI) reference model higher than the transport layer protocol of the packets and classifying the packets into one of a plurality of queues within each of the queue groups;

queuing packets into the buffer memory based on a result of the step of classifying the packets;

reading, from the buffer memory, a packet classified into a specific queue group while guaranteeing a first bandwidth assigned to the specific queue groups;

reading a packet classified into another queue group other than the specific queue group using a bandwidth of the first bandwidth that is unused; and sending each of packets read from the buffer memory to one of the output ports.

12. The packet forwarding method according to claim 11, wherein the step of reading the packets from the buffer memory includes reading the packets in accordance with a transmission priority corresponding to a queue into which a packet is classified while guaranteeing both the first bandwidth assigned to each of the queue groups and a second bandwidth assigned to each queue of the queue groups, based on the packet length of each of the packets to be sent; and sending each of the packets read from the buffer memory to one of the output ports when each of the packets is determined to read by both a first function of controlling reading of the packets from each of the queue groups and a second function of controlling reading of the packets from each of the queues within the queue groups.

13. The packet forwarding method according to claim 12, wherein the packets are read from the buffer memory while guaranteeing the first bandwidth and the second bandwidth by referring to a first counter prepared in association with each of the queue groups and a second counter prepared in association with the queue to which the second bandwidth is assigned in order to sum up the packet length of the packets to be sent for each of the queue groups and the queue, and by comparing count values of the first and the second counters corresponding to each of the packets with threshold values corresponding to the first bandwidth and the second bandwidth, respectively.

14. The packet forwarding method according to claim 13, wherein the packets are read from the queue having the highest transmission priority within each of the queue groups and read from the next queue in order of transmission priority within the queue group when the highest transmission priority queue has no packet to be read, while guaranteeing the first bandwidth of the queue group.

15. The packet forwarding method according to claim 13, further comprising the steps of:

specifying a communication service contract and the transmission priority of each of the packets based on header information of the packet, wherein the step of classifying the packets includes classifying each of the packets into the queue group corresponding to the specified communication service contract and queuing the packet into the queue corresponding to the specified transmission priority.

16. The packet forwarding method according to claim 13, wherein the step of classifying the packets includes classifying the packets into the queue groups in accordance with an algorithm which is changeable depending on control information supplied from outside of the packet switch.

17. The packet forwarding method according to claim 11, wherein the step of classifying the packets includes specifying the queue group corresponding to each of the packets based on layer protocol information in the header of the packet.

18. A packet forwarding apparatus for forwarding packets through input ports and output ports, the packet forwarding apparatus comprising:

a buffer memory;

a queuing controller which queues packets received through the input ports into the buffer memory by classifying the packets into a plurality of queue groups, each having a first bandwidth assigned individually, in accordance with either at least one of a transport layer protocol and a layer protocol of an Open Systems Interconnection (OSI) reference model higher than the transport layer protocol of the packets and classifying the packets into a plurality of queues within each of the queue groups;

a packet read-out controller which includes:

a first function of controlling reading of the packets from a predetermined queue group among the plurality of queue groups while guaranteeing the first bandwidth assigned to each of the queue groups based on the packet length of each of the packets to be sent to one of the output ports, and controlling reading of the packets from another queue group other than the predetermined queue group when there are no packets classified into the predetermined queue group and no packets to be read from the buffer memory;

a second function of controlling reading of the packets from each of the queues within the predetermined queue group while guaranteeing a second bandwidth assigned to each of the queues of the predetermined queue group based on the packet length of each of the packets to be sent to one of the output ports, and including an output module reading the packets from the buffer memory in accordance with the transmission priority among the queues in the queue group when the each of the packets is determined to read by both the first function and the second function; and a packet sending unit for sending each of the packets read from the buffer memory to one of the output ports.

* * * * *